(12) United States Patent
Hochendoner

(10) Patent No.: US 6,771,568 B2
(45) Date of Patent: Aug. 3, 2004

(54) DIGITAL AUDIO RECORDER

(75) Inventor: David Hochendoner, Allison Park, PA (US)

(73) Assignee: Sima Products Corporation, Oakmont, PA (US)

( * ) Notice: Subject to any disclaimer, the term of this patent is extended or adjusted under 35 U.S.C. 154(b) by 737 days.

(21) Appl. No.: 09/760,058

(22) Filed: Jan. 12, 2001

(65) Prior Publication Data

US 2002/0093884 A1 Jul. 18, 2002

(51) Int. Cl.⁷ .............................................. G11B 21/08
(52) U.S. Cl. .............................. 369/30.06; 369/30.08; 710/301; 711/111
(58) Field of Search ...................... 369/24.01, 30.04, 369/32.01, 30.06, 30.05, 30.08, 30.09, 30.03, 30.07, 30.19, 2, 6; 711/111; 710/301, 62, 10, 13; 707/104.1; 455/66.1; 703/24; 709/219

(56) References Cited

U.S. PATENT DOCUMENTS

| | | | |
|---|---|---|---|
| 5,161,251 A | 11/1992 | Mankovitz | 455/66.1 |
| 6,356,971 B1 * | 3/2002 | Katz et al. | 710/301 |
| 6,542,445 B2 * | 4/2003 | Ijichi et al. | 369/30.08 |
| 6,629,197 B1 * | 9/2003 | Bhogal et al. | 711/111 |

OTHER PUBLICATIONS

Disclosure made by Sima Products of an I–Mix Product in an advertisement in *Electronic Consumer Daily News*, Friday, Jan. 7, 2000, p. 39.
"Sima in the News" Press Release dated Jan. 6, 2000.
Display pages for the Consumer Electronics Show.

* cited by examiner

Primary Examiner—Ali Neyzari
(74) Attorney, Agent, or Firm—Buchanan Ingersoll, P.C.

(57) ABSTRACT

A digital audio recorder having a compact disk player for playing at least one compact disk having multiple tracks also has a hard drive and associated memory. The memory contains a database containing data relating to specific CD's such as album name, artist name, song title, and track, and may also contain playlists. The playlists can be loaded by the manufacturer or created by the user. There are correlations among the data. A central processor is connected to the compact disk player, the hard drive and associated memory, a second memory, display, audio output and buttons or knobs. Turning knobs or pushing buttons directs signals to the central processor and enables a user to operate the compact disk player, store in the second memory audio selections from a disk placed in the compact disk player, select and create playlists, and output audio selections contained in the second memory in an order according to a selected playlist. A keyboard communicates with the player through infrared signals.

8 Claims, 5 Drawing Sheets

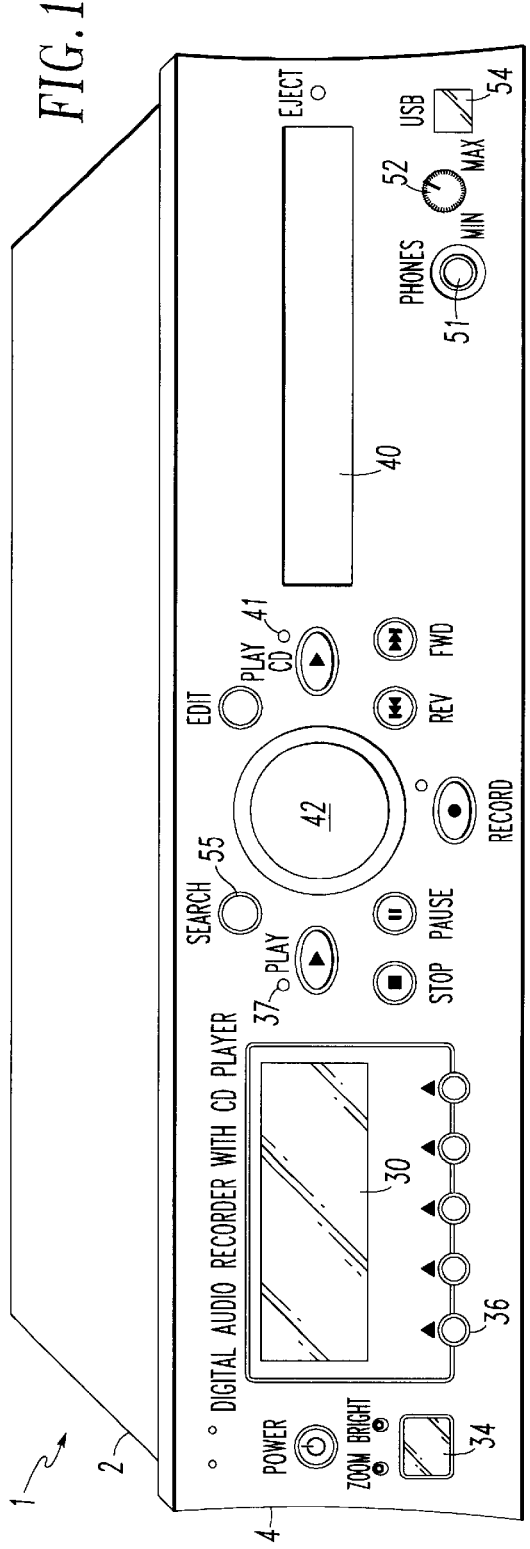
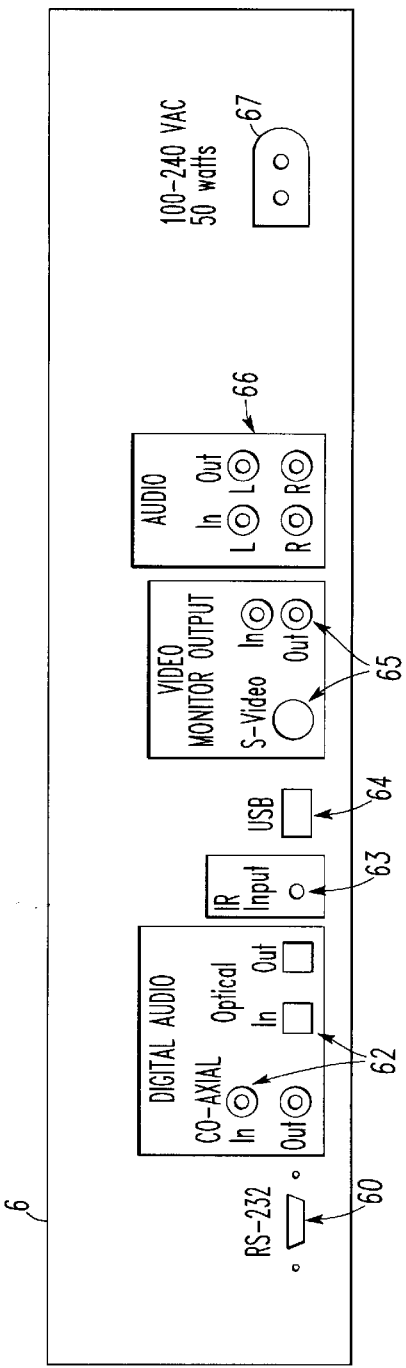

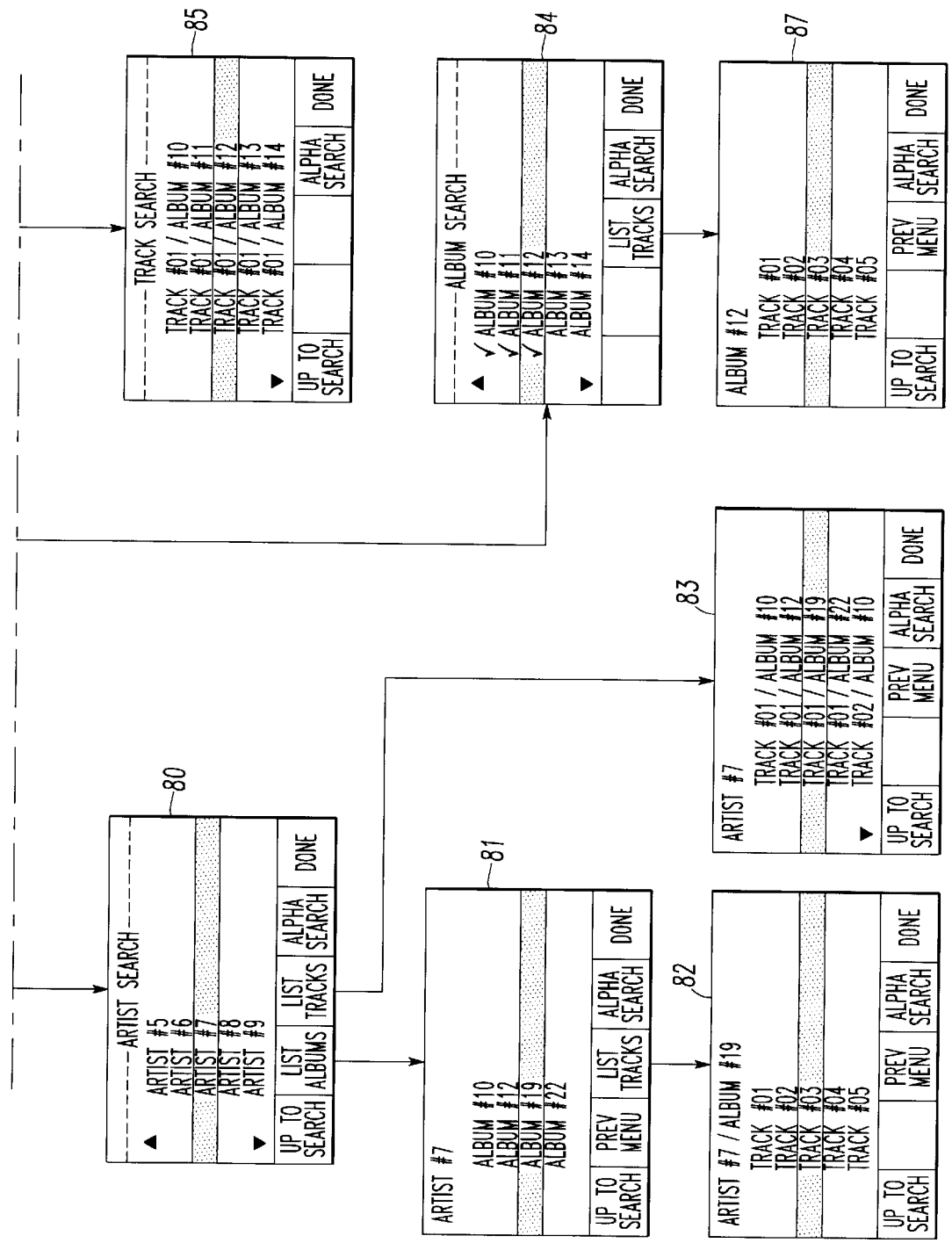

DIGITAL AUDIO RECORDER

FIELD OF INVENTION

The invention relates to products that record, store and play audio selections from a compact disc or other audio source.

BACKGROUND OF THE INVENTION

Audio programs are routinely recorded and stored in digital form. Many compact discs contain songs, musical compositions and other audio programs in digital form. There are many types of compact disk players. Some are contained in large audio systems with amplifiers and speakers. Other compact disk players are portable and connected to headphones. Most compact disks are prerecorded at a recording studio.

Compact disks can also be played on the CD drive of many computer systems. Since the audio programs on the CD are in digital form it is possible to copy those digital programs and save them as digital audio files in the memory of the computer system. Furthermore, it is also possible to transfer those digital audio files to other computers.

Recently, portable audio players have been introduced that contain a memory into which digital audio files can be loaded. Some popular players called RIOs or MP-3 players allow the owner to store within a memory in the player music programs in digital form copied from a CD player or computer memory. The owner may then select and play audio files from the memory of the portable player.

There are now available in the marketplace enhanced CD's that contain not only tracks of audio files but also other information such as artist name, song title, length of song, track associated with each song, and even lyrics. Some audio players have hardware and associated software that can read this information and display it on a display. Consequently, as a song is playing the user can see the song title and artist name on the display.

Radio broadcasters have had similar equipment that display text information about audio selections being played since the early 1990's. One such system is disclosed in U.S. Pat. No. 5,161,251 to Mankovitz. That system relies upon a digital code unique to each audio selection being present on the disk with the audio selection. The information can be displayed during, immediately after or immediately prior to the audio selection being played. Mankovitz also teaches that the text information and associated audio files can be selected and played in any desired order.

Although the system disclosed in the '251 patent and the enhanced CD players work well, they rely upon CD's that contain information about the audio selections on the disk Yet, many people have CD's that do not contain this information. Although these CD's could be played on these devices, no text information can be displayed.

Databases have been compiled that contain artist name, album or CD titles, track location and song length for hundreds of recordings. Some of these databases are available to the public over the internet and are searchable. One such database is owned by the Free Software Foundation, Inc. and can be accessed at web site www.freedb.org.

Standard CD audio recordings that are not enhanced have been available in the market for many years and are still being sold. There is a need for a digital audio player that can not only read enhanced CD's but that can also provide similar information to the user about CD's that are not enhanced. That information may include artist name, song title, track location and other data.

There is also a need for a digital audio recorder that can receive audio programs in analog form, record them in digital form and store the recorded programs along with associated text information.

There is also a need for a digital audio recorder that can receive audio files from a personal computer or another digital audio player.

SUMMARY OF THE INVENTION

I provide a digital audio recorder having analog inputs, digital inputs and a compact disk player for playing at least one compact disk having multiple tracks as well as a hard drive and associated memory. The memory contains a database containing data relating to specific CD's such as album name, artist name, song title, and track, and may also contain playlists. The playlists can be loaded by the manufacturer or created by the user. There are correlations among the data such as album name to artist name, album name to song title, album name to playlist, artist name to song title, artist name to playlist, song title to playlist, and song title to track. I prefer to provide a second memory in which the digital audio files are stored. The player also has a display or external video output to a TV that can display selected album name and song to be played as well as other data selected from the database. Of course there is an audio output to which a speaker, amplifier or headphone can be connected and at least one button or knob for operating the player. A central processor is connected to the compact disk player, the hard drive and associated memory, the second memory, the display, the audio output and the buttons or knobs. Turning knobs or pushing buttons directs signals to the central processor and enables a user to operate the compact disk player, store in the second memory audio selections from a disk placed in the compact disk player or from an analog to digital data stream, select and create playlists, and output audio selections contained in the second memory in an order according to a selected playlist. I also provide a keyboard removably connected to the central processor in a manner to enable a user to input data into the database. A preferred keyboard communicates with the player through infrared signals.

BRIEF DESCRIPTION OF THE DRAWINGS

FIG. 1 is a front view of a present preferred embodiment of the digital audio recorder of the present invention.

FIG. 2 is a rear view thereof.

FIGS. 4A and 4B together contain a flow chart of searches that can be made with a present preferred embodiment with present preferred displays being shown in detail in FIGS. 5 through 14.

DESCRIPTION OF THE PREFERRED EMBODIMENTS

Figure 3:
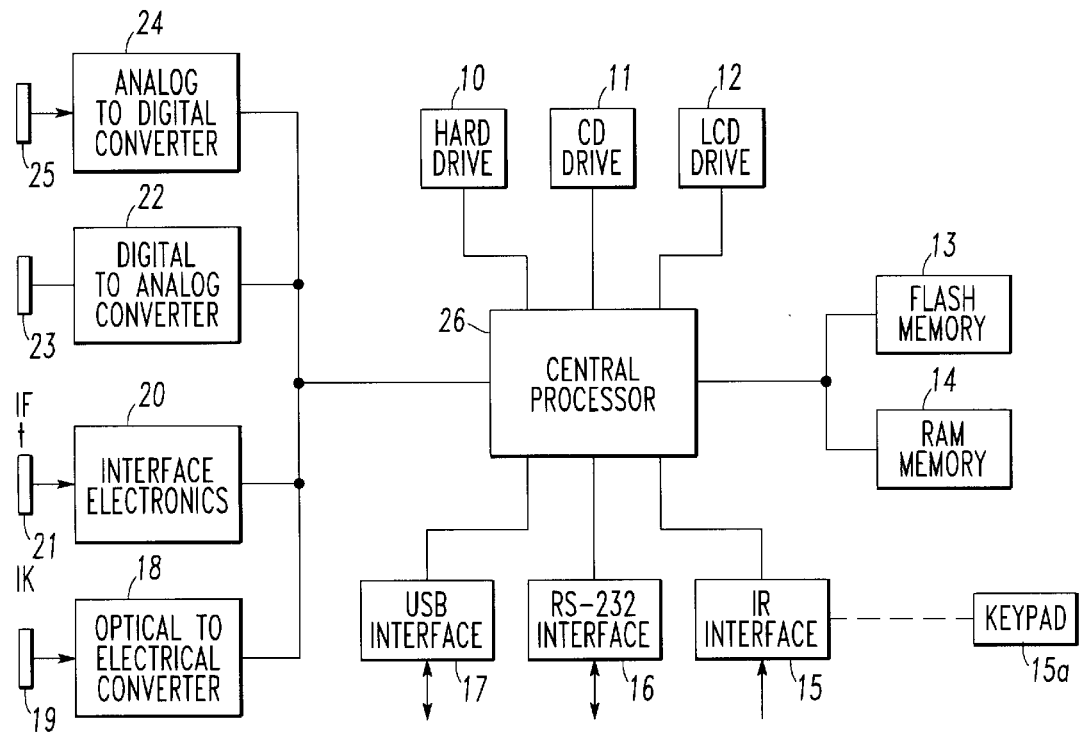
FIG. 3 is a simplified block diagram of the digital audio recorder shown in FIG. 1.

A present preferred embodiment of my digital audio recorder I shown in FIGS. 1 and 2 is contained in a generally rectangular housing 2 having a front display panel 4 and a back panel 6 containing input and output jacks. As indicated by FIG. 3 within the housing there is a memory containing hard drive 10, CD drive 11, LCD panel drive 12, FLASH memory 13, RAM memory 14, IR interface 15 that can communicate with a keypad or keyboard 15a, an RS-232 interface 16 and a USB interface 17 for connection to a computer, another digital audio recorder or other peripheral device (not shown) and several ports 19, 21, 23 and 25 that allow input from a CD player or other digital source, output to a television or display monitor and connection to a stereo receiver. Each port may have more than one jack associated with it. Connected to port 19 is an optical to electrical converter 18. Interface electronics 20 that enable connection to a television (not shown) are connected to port 21. A digital to analog converter 22 associated with port 23 and an analog to digital converter 24 associated with port 25 permit connection to a stereo receiver. All of these electronic devices and circuits are connected to a central processor 26 that controls the operation of the device.

The present preferred embodiment could store hundreds of hours of music and other audio programs in digital files within the hard drive. Those digital files may have come from not only CD's placed in the CD drive, but also from old albums played on a turntable and input through a stereo system. Other sources of such digital files are tape players, a computer or other device containing digital music files and even from microphones used in live performances. Furthermore, programs and associated databases within the FLASH memory, RAM memory and hard drive allow the user to identify, select and organize the audio programs into user created playlists.

Within the hard drive memory and other memories there are databases containing lists of albums, artists, song titles and tracks as well as program rules that correlate the data. I prefer to preload a file of such data for albums that have been popular in the past even though the audio selections on that album are not recorded in memory. When a user inputs that album he can merely identify it. From that identification all of the information relating to that album and contained in memory is automatically associated with that audio file. This audio player recorder has the ability to identify, read and store information from CD's with data text. For some CD's that do not contain text data, some digital identification feature applied by the manufacturer, the CD drive reads that feature. Then the processor determines if data about that CD is contained in memory. If so, the information is then associated with any audio selections from the CD that are stored in memory.

Referring now to FIG. 1, the present preferred digital recorder 1 has a front panel 4. The front panel 4 contains all the buttons and knobs required to operate the device as well as the door 40 for the CD drive 11 and an LCD display 30 used for searching and creating playlists. To the left of the LCD display is the power switch, a zoom button and brightness button. These buttons permit selection of larger text size and change the brightness on the LCD display 30. Below those buttons there is a window 34 for the IR interface. This window is the target for the IR transmitter in the keyboard. There are five function buttons 36 below the LCD display 30. A PLAY button starts playing of selected music. LED 37 next to the PLAY button is illuminated when music is playing. There are stop button pause buttons below the PLAY button, as well as fast forward and reverse buttons below the PLAY CD button. A scroll/select knob 42 is provided in the center of the front panel. Rotating this knob 42 causes various menus to be displayed on the LCD display 30. A menu is selected by pushing the knob. A RECORD button below the scroll knob 42 will direct the audio player to record in memory input from the internal CD player or input from an external analog or digital source. The CD player is activated by the PLAY CD button. LED 41 illuminates when the CD is being played. The stop, pause, reverse and fast forward buttons are located between the scroll/select knob 42 and also can be used for the CD player. The CD eject button is to the right of the door 40. A headphone jack 51 and headphone volume control 52 are located below the door. The connector 54 for USB interface 17 is next to the headphone volume control. Above and to either side of the scroll/select knob 42 are the search button and edit button.

The rear panel 6, shown in FIG. 2, contains an RS-232 port 60, input jacks for digital audio devices 62, a second IR input 63, a second USB port 64, output jacks 65 for a video device such as a television and audio input and output jacks 66 to enable the device to be connected to a stereo receiver. The power cord connects to the back panel at plug 67.

A present preferred embodiment of the digital audio player may be sold with music pre-recorded and stored as digital files in memory. These music files are identified in a playlist. Consequently, the digital audio player can be operated to play this pre-recorded music, to play music on a CD placed in the CD player or to play music that has been recorded by the user. The CD player is operated in the same manner as conventional CD players using the play, stop, pause, fast forward, and reverse buttons. However, when a CD is placed in the CD drive the audio player looks to see if it is a CD with text data or has other identification. If the CD has information, the audio player reads the information on the CD and displays album title, artist and track information on the LCD display. If it is not a CD with text data but can still be identified the audio player checks its memory for information about the CD in its memory and displays that information on the LCD display. If the player cannot identify the CD it will query the user with the LCD display and allow the user to provide album name, artist name, and track information using the front panel knob or keyboard. If the songs are stored in memory this information will be stored in memory and associated with the stored songs. The audio player will follow a similar query and storage procedure when music files are input from a stereo or other source and stored in memory.

Figure 5:
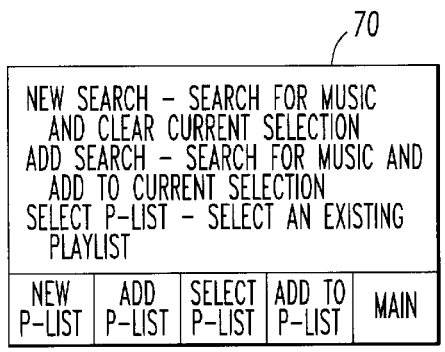
FIG. 5 illustrates the initial search display in a present preferred embodiment of the digital audio recorder.

The procedure that is followed to play music that has been recorded by the manufacturer or the user is illustrated by the flow chart of FIG. 5. Referring to FIGS. 1 and 5, the user begins the process by pressing the SEARCH button. Doing that causes a search screen 70 shown in detail in FIG. 6 to appear on the LCD display. The search screen, as well as most other screen display, is divided into a large block or field 71 above five smaller blocks 72, 73, 74, 75 and 76. The smaller blocks tell the user the function that is performed by pressing the function button 36 below that box. In this embodiment pressing the first function button identified as "NEW P-LIST" clears the currently selected music and allows the user to look for new music and optionally to create a playlist. These opportunities are reported on the search menu 78 that appears when the first function button is pushed. That menu is shown in detail in FIG. 6. Pressing the second function button labeled "ADD P-LIST" also causes the search menu of FIG. 6 to appear on the LCD display 30 and allows the user to look for additional music to the current selection. The third function button is identified as "SELECT P-LIST" and lets the user select a playlist that he has already created. Pushing this button causes the playlist search screen 79, shown in detail in FIG. 7 to appear. The fourth function button is ADD TO P-LIST to add additional songs to a playlist. The fifth function button is labeled "MAIN". Pressing this button returns to the main menu, which indicates the status of the device. That menu may say "NO CD IN TRAY OR NO PLAYLIST SELECTED" if that is the status. If music is then playing the display will identify the song being played.

Figure 7:
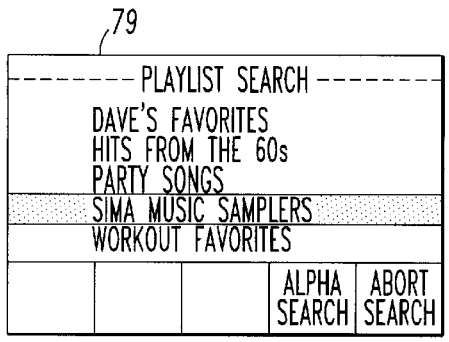
FIG. 7 shows a present preferred playlist search display.

As can be seen on the playlist search screen shown in FIG. 7 this search screen contains a list of the playlists that are stored in memory. One of the playlists will be highlighted. To select that playlist the user presses the scroll/select knob 42. To select another playlist the user turns the knob 42 until the desired playlist is highlighted then he pushed the knob. When this screen appears the user can call up an alphabet at the top of the display by pressing the fourth function button under the block labeled "ALPHA SEARCH" and search for playlists alphabetically. Letters are selected by using the scroll/select knob 42. Pushing the fifth function button under the box labeled "ABORT SEARCH" returns the user to the "INITIAL SEARCH" menu 70 shown in FIG. 5.

Figure 6:
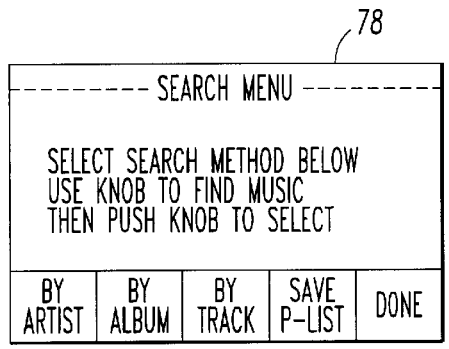
FIG. 6 shows a present preferred search menu display.
Figure 4A:
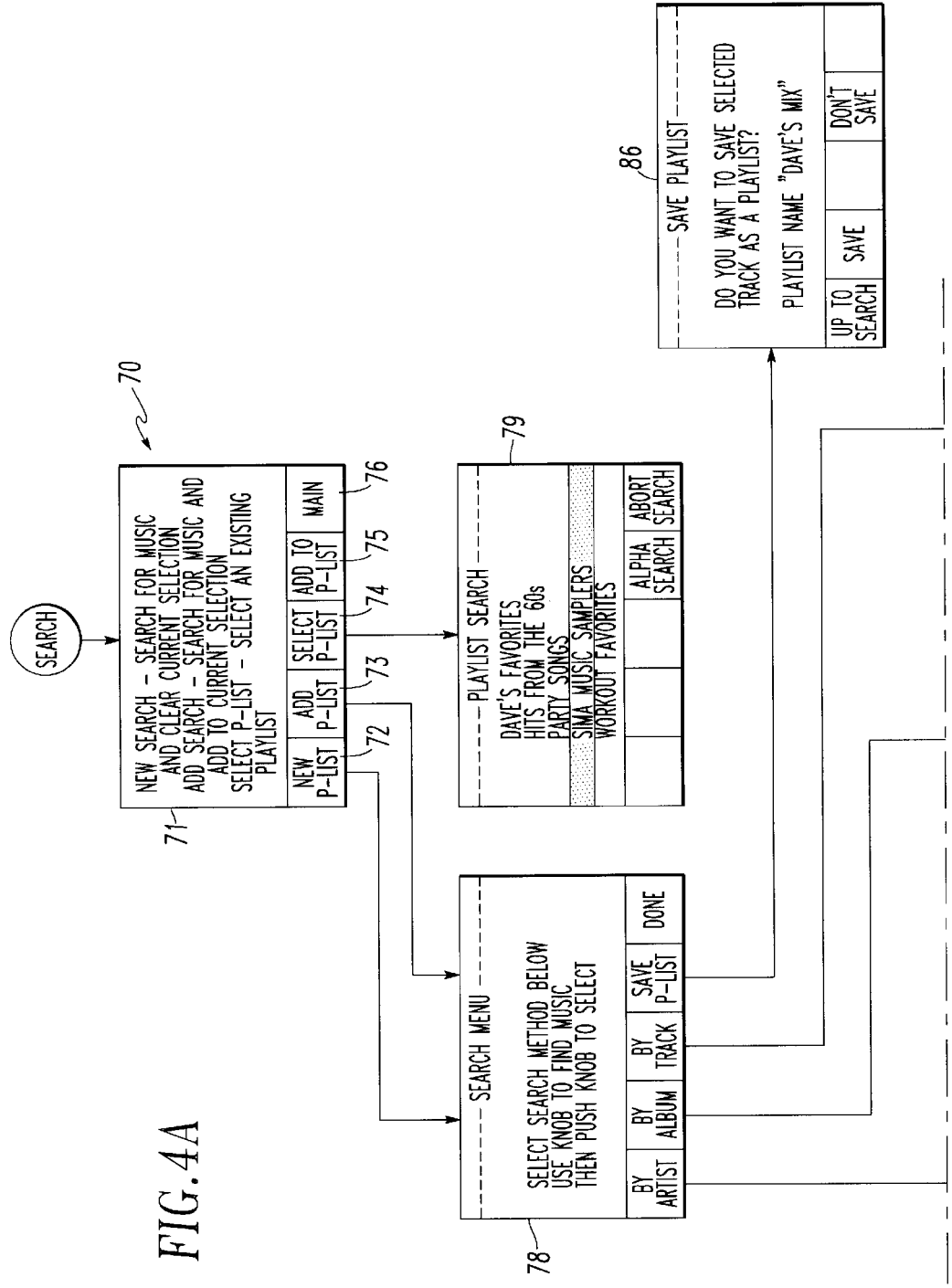

The search menu shown in FIG. 6 allows the user to search for music stored in memory by artist, by album, by or track and also allows him to save a playlist that he has created by pushing the function button located below the box containing the desired function.

Figure 8:
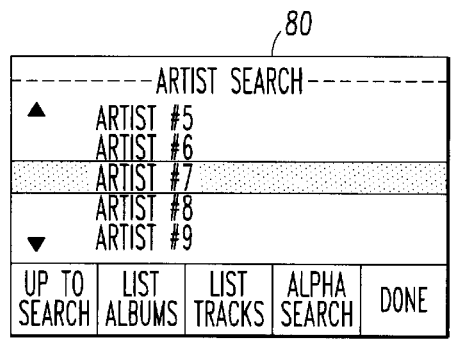
FIG. 8 shows a present preferred artist search display.
Figure 9:
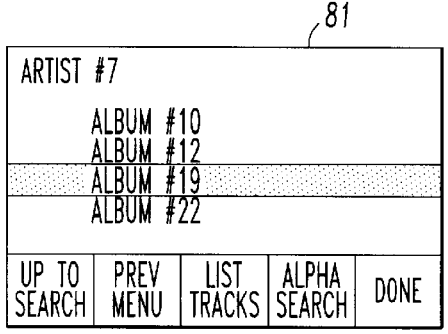
FIG. 9 shows a present preferred display of albums associated with a selected artist.
Figure 10:
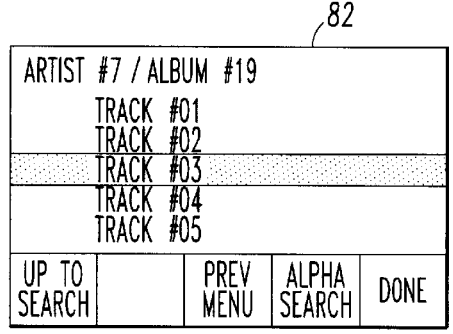
FIG. 10 shows a present preferred display of tracks in a selected album.
Figure 11:
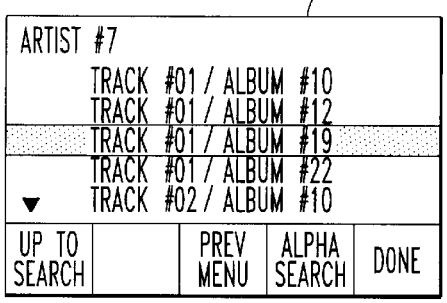
FIG. 11 shows a present preferred display of all tracks for a selected artist.
Figure 12:
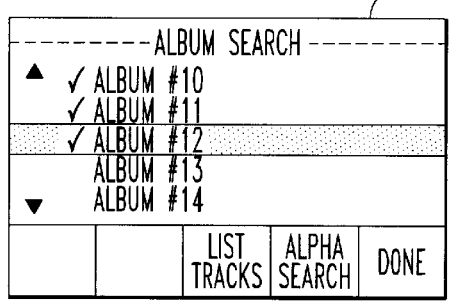
FIG. 12 shows a present preferred album search display.

If the user presses the first function button labeled "BY ARTIST" while the search menu is displayed the "ARTIST SEARCH" screen 80 will appear. That screen is shown in detail in FIG. 8. That screen 80 displays a list of artists by name in alphabetical order. For purposes of illustration these artists are named "Artist #" followed by a number in FIG. 8. The desired artist is selected using the scroll/select knob 42. After the artist is selected the function buttons can be used to obtain a list if albums by that artist screen 81, or a list of tracks and associated album screen 83. Other function buttons will allow the user to return to the search menu, search artists alphabetically or return to the main menu. If the user selects the second function button, below the "LIST TRACKS" box a display of the tracks on the selected album will appear as shown in block 87 which is similar to block 82. That display is shown in detail in FIG. 10. Should the user press the "LIST TRACKS" button while the artist search menu 80 is being displayed a list of all tracks by the selected artist and the album associated with each track 83 will appear on the LCD display. That menu is shown in detail in FIG. 11.

Another option that the user has at the search menu 78 is to search by album. He does this by pressing the second function button causing the album search menu 84 to appear. One of the albums on the list of albums is highlighted. The scroll/select knob is used to select the desired album. The user can obtain a list of the tracks on the selected album by pressing the third function button. That will cause the screen shown in FIG. 10 to appear.

Figure 13:
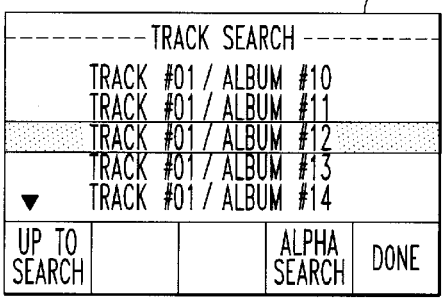
FIG. 13 shows a present preferred track search display.

A user can also do a track search from the search menu 78 by pushing the third function button. That will cause a track search menu 85 to appear. That menu is shown in detail in FIG. 13.

Figure 14:
FIG. 14 shows a present preferred save playlist display.

If a user wants to save one or more particular songs or tracks in a playlist the user selects that track and then returns to the search menu 78. Then he pushes the fourth function button causing the save playlist menu 86 to appear. That menu is shown in detail in FIG. 14. At that point the user can press the function button below the "SAVE" box to save the track in the playlist identified on the screen.

Throughout this disclosure the term album has been used to identify a set of songs sold by the artist under a selected name. These songs could have been offered on any medium including CD's, tapes and pressed phonograph albums.

I claim:

1. A digital audio recorder comprising:

a. a compact disk player for playing at least one compact disk having multiple tracks, each track containing an audio selection;

b. at least one hard drive and associated memory, the memory containing a database containing types of data selected from the group consisting of album name, artist name, song title, track playlist and correlations among the data, at least one of the correlations selected from the group consisting of album name to artist name, album name to song title, album name to playlist, artist name to song title, artist name to playlist, song title to playlist, and song title to track;

c. a second memory for digital audio files each audio file associated with at least one type of data;

d. a display sized and configured to display data selected from the database;

e. an audio output;

f. at least one button or knob;

g. a central processor connected to the compact disk player, the at least one hard drive and associated memory, the second memory, the display, the audio output and the at least one button or knob to enable a user to operate the compact disk player, store in the second memory audio selections from a disk placed in the compact disk player, select and create playlists, and output audio selections contained in the second memory in an order according to a selected playlist; and h. a keypad removably connected to the central processor in a manner to enable a user to input data into the database.

2. The digital audio recorder of claim 1 also comprising an audio input connected to the central processor.

3. The digital audio recorder of claim 2 also comprising an analog to digital converter attached to the audio input.

4. The digital audio recorder of claim 1 also comprising an RS 232 input connected to the central processor.

5. The digital audio recorder of claim 1 also comprising at least one USB port connected to the central processor.

6. The digital audio recorder of claim 1 also wherein the database contains album, artist and song titles associated with audio selections no contained in the second memory.

7. The digital audio recorder of claim 1 also comprising:

a. an infrared transmitter connected to the keypad; and b. an infrared receiver connected to the central processor for receiving data from the infrared transmitter.

8. The digital audio recorder of claim 1 also comprising a digital to analog converter connected to the audio output.

* * * * *